United States Patent [19]
Counts

[11] Patent Number: 4,866,350
[45] Date of Patent: Sep. 12, 1989

[54] FLUORESCENT LAMP SYSTEM

[75] Inventor: Richard C. Counts, Dallas, Tex.

[73] Assignee: Usi Lighting, Inc., San Leandro, Calif.

[21] Appl. No.: 177,161

[22] Filed: Apr. 4, 1988

[51] Int. Cl.4 .............................................. H04B 41/36
[52] U.S. Cl. ................................ 315/209 R; 315/226; 315/307; 315/309
[58] Field of Search .................... 315/307, 309, 209 R, 315/209 T, 226, DIG. 2, DIG. 7

[56] References Cited

U.S. PATENT DOCUMENTS

| | | | |
|---|---|---|---|
| 4,170,746 | 10/1979 | Davenport | 315/246 |
| 4,220,895 | 9/1980 | Nuver | 315/195 |
| 4,306,177 | 12/1981 | Kaneda | 315/244 |
| 4,544,862 | 10/1985 | Yamazaki et al. | 315/209 R |

*Primary Examiner*—David Mis
*Attorney, Agent, or Firm*—Thomas E. Schatzel

[57] ABSTRACT

Power is provided to a fluorescent lamp through a single integrated circuit (IC) chip. The IC chip contains control logic and power switches. The control logic operates the switches at a frequency which is optimum for the fluorescent lamp. The control logic includes circuits for thermal shut down, load status detection and voltage compensation.

12 Claims, 2 Drawing Sheets

FLUORESCENT LAMP SYSTEM

BACKGROUND OF THE INVENTION

1. Field of the Invention

This invention relates generally to fluorescent lamp systems and more particularly to such systems wherein the lamp is operated at a high frequency by means of control logic and power switching devices which are located on a single integrated circuit chip.

2. Description of the Prior Art

Fluorescent lamps require a ballast circuit because fluorescent lamps have a negative resistant characteristic. As current flowing through the lamp increases, voltage across the lamp decreases. Eventually, the lamp will act like a short circuit if the current is not limited in some way.

A ballast circuit acts to limit current flowing through the lamp. The typical ballast circuit operates at line frequency (sixty hertz) and is primarily just a large inductor. This simple type of ballast circuit has been used with fluorescent lamps for many years. It does however have some disadvantages. The large inductor makes the circuit heavy and bulky. It is also inefficient because fluorescent lamps operate at optimum efficiency at higher frequencies in the range of twenty-five kilohertz to fifty kilohertz.

Prior art systems have been made which operate fluorescent lamps in this higher frequency range. However, the complexity of these systems has made them highly unreliable and costly compared with the simple inductor ballast systems. Even though the lamp operates more efficiently, the energy savings has not been enough to off-set the initial high cost of these lamp systems and thus, they have not been economically viable. Examples of such systems include U.S. Pat. No. 4,170,746, issued to J. Davenport; U.S. Pat. No. 4,544,862, issued to H. Yamazaki, et al.; U.S. Pat. No. 4,220,895, issued to E. Nuver; and U.S. Pat. No. 4,306,177, issued to I. Kaneda.

Various federal and state codes have been passed recently which call for more efficient lighting. There is a need for an efficient and low cost fluorescent lamp system.

SUMMARY OF THE PRESENT INVENTION

It is therefore an object of the present invention to provide a fluorescent lamp system which is efficient, reliable and inexpensive.

It is another object of the present invention to provide a fluorescent lamp system which achieves high frequency power switching on a single integrated circuit chip.

Briefly, in a preferred embodiment, the present invention comprises a "Smart Power" integrated circuit (IC) chip, an AC power source, and a fluorescent lamp. The IC chip has a voltage regulator to provide power to various logic circuits on the chip. The power source is connected to the lamp through power transistors located on the IC. A control and diagnostic circuit is connected to and sets the frequency for a frequency oscillator and charge pump circuit. The frequency oscillator and charge pump circuit is connected to and provides a timing signal to a drive circuit. The drive circuit is connected to and controls the power transistors such that the lamp is driven at the desired frequency. A thermal overload circuit is connected to the drive circuit to provide a thermal shut down signal if the IC gets too hot. A load status detection circuit is connected between the lamp and the control and diagnostic circuits and provides a shut off signal to protect against overload. A voltage compensation circuit is connected to the power source and the controlling diagnostic circuit and allows for an optional dimming feature.

An advantage of the present invention is that it provides a fluorescent lamp system which is efficient, reliable and inexpensive.

It is another advantage of the present invention in that it provides a fluorescent lamp system which achieves high frequency power switching on a single integrated circuit chip.

These and other objects and advantages of the present invention will no doubt become obvious to those of ordinary skill in the art after having read the following detailed description of the preferred embodiments which are illustrated in the various drawing figures.

IN THE DRAWINGS

DETAILED DESCRIPTION OF THE PREFERRED EMBODIMENTS

Figure 1:
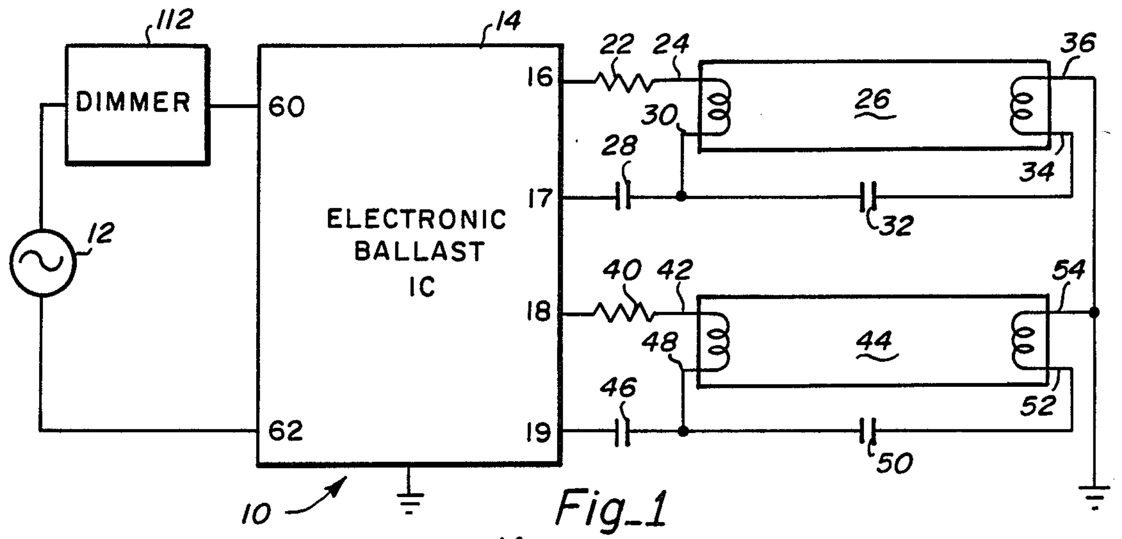
FIG. 1 shows a schematic of a first embodiment of the system of the present invention.

FIG. 1 shows a schematic of a first embodiment of a fluorescent lamp system of the present invention and is designated by the general reference number 10. An alternating current power source 12 is connected to an integrated circuit (IC) 14. The power source 12 is typically a standard line source (one hundred twenty volts AC, sixty hertz).

The IC 14 has a plurality of output terminals 16, 17, 18 and 19. Output terminal 16 is connected to a resistor 22 which in turn is connected to a terminal 24 of a fluorescent lamp 26. A capacitor 28 is connected to terminal 17 and a terminal 30 of lamp 26. A capacitor 32 is connected intermediate terminal 30 and a terminal 34 of lamp 26. A terminal 36 of lamp 26 is connected to ground.

A resistor 40 is connected between terminal 18 and a terminal 42 of a fluorescent lamp 44. A capacitor 46 is connected between terminal 19 and a terminal 48 of lamp 44. A capacitor 50 is connected between terminal 48 and a terminal 52 of lamp 44. A terminal 54 of lamp 44 is connected to ground. Resistors 22 and 40 and capacitors 28, 32, 46 and 50 limit the current flowing through lamps 26 and 44.

Figure 2:
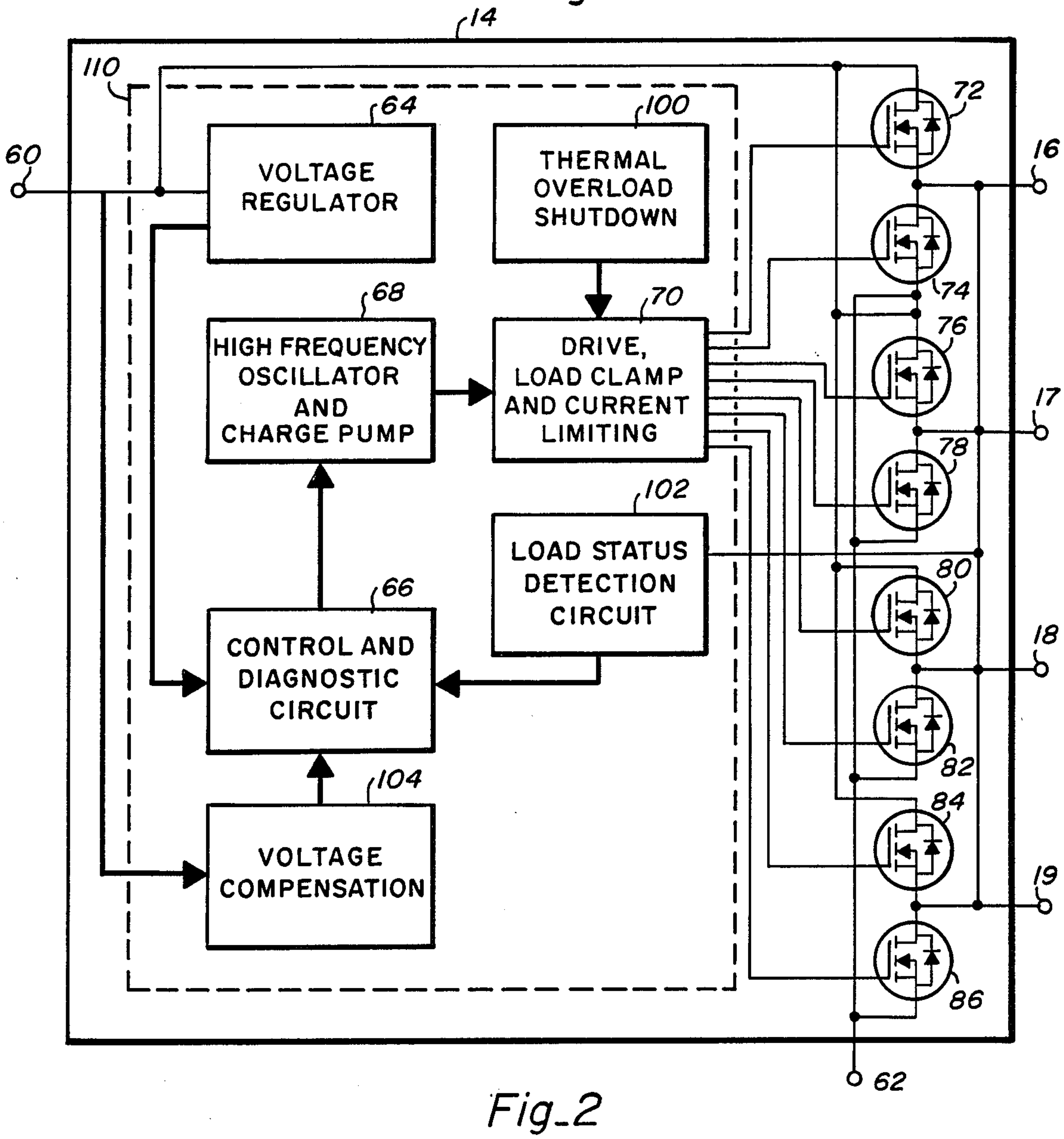
FIG. 2 shows a schematic of an integrated circuit chip of FIG. 1.

FIG. 2 shows a schematic of IC 14 of FIG. 1. The IC 14 has a pair of input terminals 60 and 62 which are connected to power source 12. A voltage regulator circuit 64 is connected to terminal 60. Circuit 64 is connected to and provides power to a control and diagnostic circuit 66. A high frequency oscillator and charge pump circuit 68 is connected to the control and diagnostic circuit 66. Circuit 68 has a variable speed oscillator which can be set to run at frequencies between twenty-five kilohertz and fifty kilohertz responsive to control circuit 66.

A drive, load clamp, and current limiting circuit 70 is connected to circuit 68. Circuit 70 is connected to a plurality of power transistors 72, 74, 76, 78, 80, 82, 84 and 86. Transistors 72, 76, 80 and 84 are each connected between terminal 60 and terminals 16, 17, 18 and 19, respectively. Transistors 74, 78, 82 and 86 are each connected between terminal 62 and terminal 16, 17, 18 and 19, respectively.

A thermal overload shut down circuit 100 is connected to the drive circuit 70. A load status detection circuit 102 is connected between terminals 16, 17, 18 and 19 and the control circuit 66. A voltage compensation circuit 104 is connected between terminal 60 and control circuit 66. Circuits 64, 66, 68, 70, 100, 102 and 104 comprise a control and drive (CD) section 110 of IC 14.

The IC 14 is made by using the process for manufacturing "Smart Power" IC chips. "Smart Power" is a trademark of the SGS Company of Italy. Micrel Company of Sunnyvale, Calif., is also involved in the manufacture of chips using this process. This process allows for the manufacture of single IC chips which contain both logic circuits and power switching devices.

In operation, the power source 12 provides an alternating current across terminals 60 and 62. The voltage regulator circuit 64 supplies power to the logic circuits of the control circuit 66. The control circuit 66 sets the high frequency oscillator circuit 68 to run at a certain frequency, such as twenty-five kilohertz. The high frequency oscillator and charge pump circuit 68 provides twenty-five kilohertz timing pulses to the drive circuit 70. Circuit 70 has load clamp and current limiting devices to protect the circuitry from any overloads. The drive circuit 70 uses the timing pulses from circuit 68 to provide control pulses to transistors 72, 74, 76, 78, 80, 82, 84 and 86. These transistors are operated such that the alternating current from terminals 60 and 62 is alternately switched between lamps 26 and 44 at a high frequency, such as twenty-five kilohertz. For example, when transistors 72 and 76 allow current to flow to lamp 26, transistors 80 and 84 are controlled to block the flow of current to lamp 44. Thus, the present invention is able to use a standard sixty hertz alternating current line and drive the lamps at the more efficient higher frequency.

Figure 3:
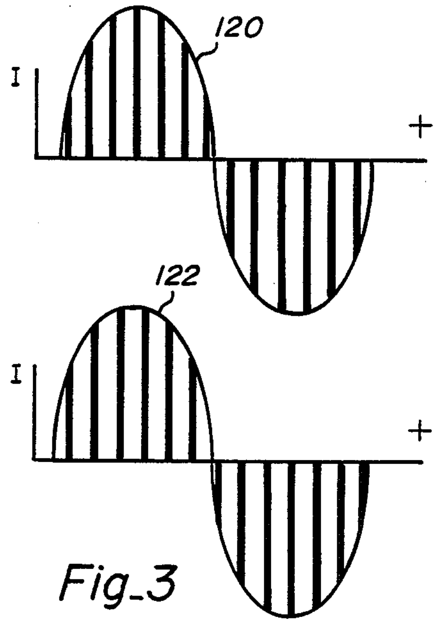
FIG. 3 shows two graphs illustrating the amount of current flowing through the lamps of FIG. 1.

FIG. 3 shows a pair of graphs 120 and 122 which represent the current flows through lamps 26 and 44, respectively. Graphs 120 and 122 represent the standard sixty hertz alternating current sine wave which has been chopped up at the frequency rate of the oscillator circuit 68. During the time period when graph 120 shows a current flow, graph 122 shows a zero current flow and vice versa.

Returning now to FIG. 2, as the system 10 operates, the thermal overload shut down circuit 100 constantly monitors the temperature of IC 14. If the temperature goes over an acceptable limit, circuit 100 sends a thermal shut down signal to drive circuit 70 which causes drive circuit 70 to shut down. Circuit 70 causes the transistors 72–86 to block the flow of current to lamps 26 and 44.

The load status detection circuit 102 measures the power flowing to lamps 26 and 44. If a short circuit is detected, circuit 102 sends a shut-off signal to the control circuit 66. Circuit 66 then causes oscillator 68 to shut off and this in turn blocks the flow of power to lamps 26 and 44.

The voltage compensation circuit 104 provides for an optional dimming feature. A dimming device or switch 112 may be connected between power source 12 and IC 14. This device 112 is used to dim standard incandescent lamps by varying the voltage to the lamps. Ordinarily, these dimmers are not used with fluorescent lamps because as the voltage across the lamp is reduced, the filament voltage is also reduced. This causes the fluorescent lamp to go out.

Voltage compensator circuit 104 detects when the voltage drops as a result of the dimmer 112. The circuit 104 compensates for the reduced voltage by sending a signal to control circuit 66 which causes circuit 66 to run the oscillator 68 at a higher frequency. The higher frequency compensates for the reduced filament voltage and allows lamps 26 and 44 to remain lit at a reduced voltage and consequently a reduced light intensity.

Figure 4:
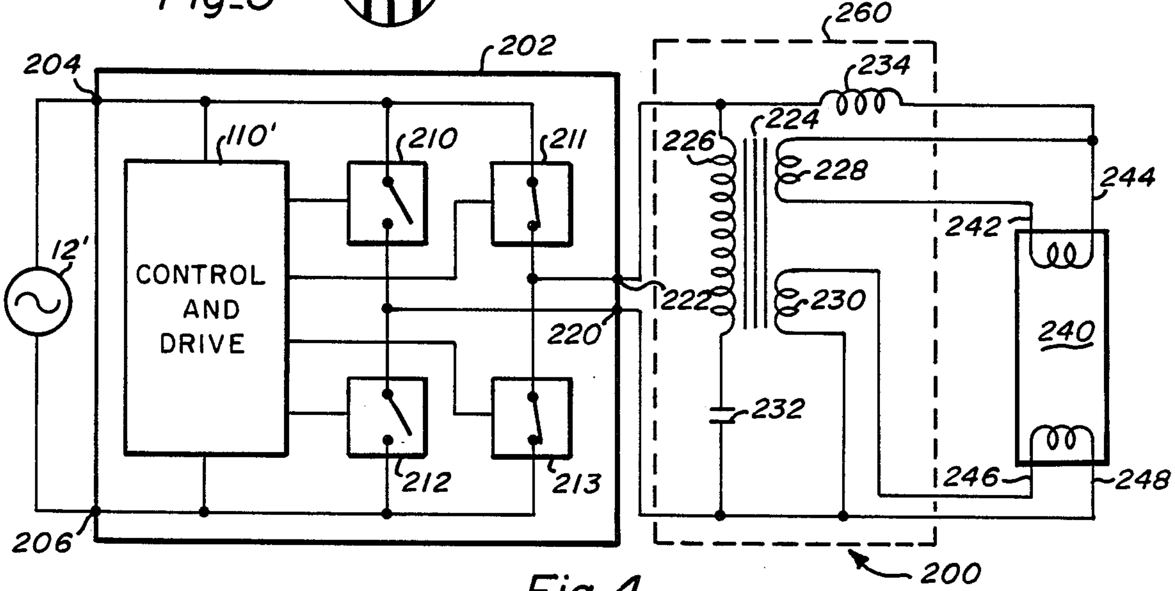
FIG. 4 shows a schematic of a second embodiment of the system of the present invention.

FIG. 4 shows an alternative embodiment of the system of the present invention and is designated by the general reference number 200. Elements of system 200 which are similar to elements of system 10 of FIGS. 1 and 2 are designated by a prime number. An IC 202 is connected to an alternating current power source 12' at a pair of terminals 204 and 206. IC 202 is manufactured using processes for the "smart power" chip. A control and drive section 110' is connected to and controls a plurality of bi-directional switches 210, 211, 212 and 213 on IC chip 202. Switch 210 is connected between terminal 204 and a terminal 220. Switch 211 is connected between terminal 204 and a terminal 222. Switch 212 is connected between terminal 206 and terminal 220. Switch 213 is connected between terminal 206 and terminal 222.

A transformer 224 has a first winding 226, a second winding 228, and a third winding 230. First winding 226 of transformer 224 and a capacitor 232 are connected in series across terminals 220 and 222. An inductor 234 is connected to terminal 222. A fluorescent lamp 240 has a plurality of terminals 242, 244, 246 and 248. Terminal 244 is connected to inductor 234 and second winding 228. Terminal 242 is connected to second winding 228. Terminal 246 is connected to third winding 230. Terminal 248 is connected to third winding 230 and terminal 220.

During operation of system 200, the control and drive section 110' operates similar to section 110 of system 10. A drive, load clamp and current limiting circuit in section 110' controls switches 210–213. Switches 210 and 213 are open when switches 211 and 212 are closed, and visa versa. The switches 210–213 are operated at a high frequency, such as twenty-five kilohertz. The result is that lamp 240 is driven at a high frequency. Transformer 224, capacitor 232 and inductor 234, form a current limiting circuit 260.

Figure 5:
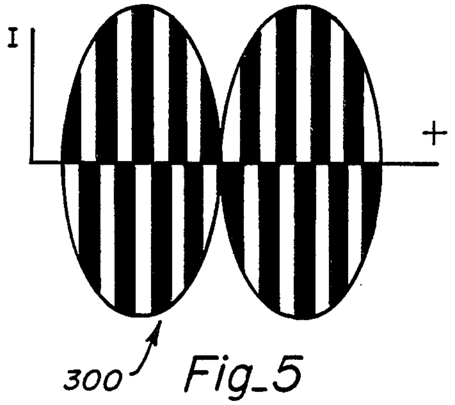
FIG. 5 shows a graph illustrating the amount of current flowing through the lamp of FIG. 4.

FIG. 5 shows a graph 300 of the current flowing to lamp 240 of system 200. The graph 300 shows a standard sixty hertz sine wave which is alternately inverted at a high frequency.

Figure 6:
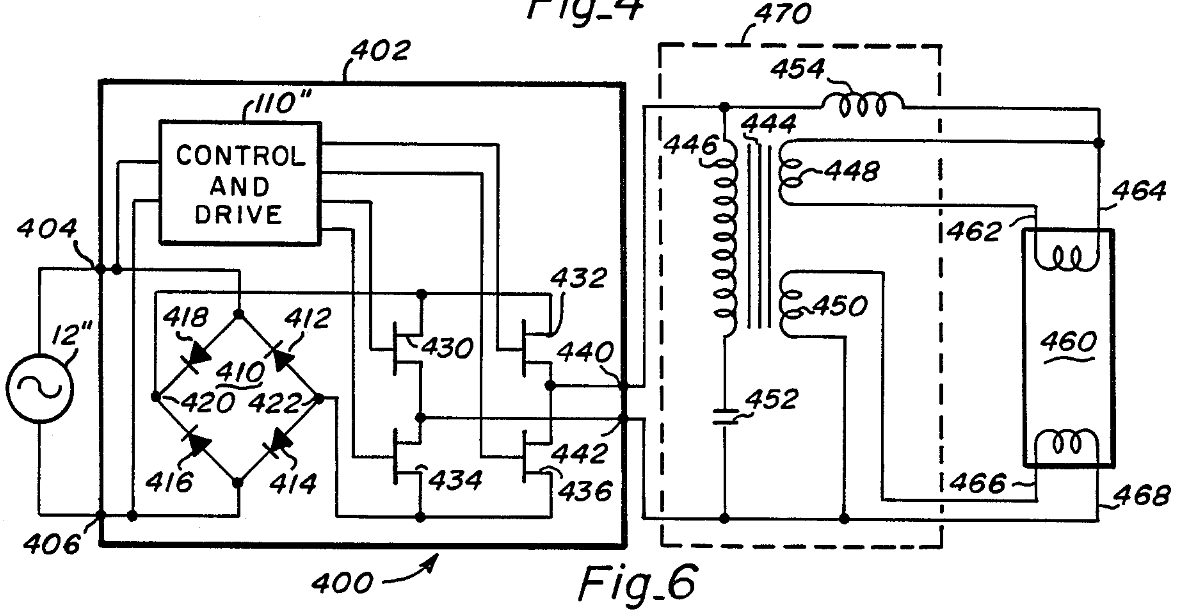
FIG. 6 shows a schematic of a third embodiment of the system of the present invention.

FIG. 6 shows another alternative embodiment of the system of the present invention and is designated by the general reference number 400. Elements of system 400 which are similar to elements of system 10 of FIGS. 1 and 2 are designated by a double prime number.

An IC chip 402 is connected to an alternating current power source 12" at a pair of terminals 404 and 406. IC chip 402 is manufactured using processes for a "smart power" chip. IC 402 contains a full wave rectifier 410 which is comprised of a plurality of diodes 412, 414, 416 and 418. Rectifier 410 is connected to terminals 404 and 406 and has a pair of output terminals 420 and 422.

A control and drive section 110" is connected to terminals 404 and 406. Section 110" is connected to and controls a plurality of DMOS field effect transistors 430, 432, 434 and 436. IC 402 has a pair of output terminals 440 and 442. Transistor 430 is connected between terminals 420 an 442. Transistor 432 is connected between terminals 420 and 440. Transistor 434 is connected between terminals 422 and 442. Transistor 436 is connected between terminals 422 and 440.

A transformer 444 has a first winding 446, a second winding 448 and a third winding 450. First winding 446 of transformer 444 and a capacitor 452 are connected in series across terminals 440 and 442. An inductor 454 is connected to terminal 140. A fluorescent lamp 260 has a plurality of terminals 462, 464, 466 and 468. Terminal 462 is connected to second winding 448. Terminal 464 is connected to inductor 454 and second winding 448. Terminal 466 is connected to third winding 450. Terminal 468 is connected to third winding 450 and terminal 442.

During operation of system 400, the rectifier 410 rectifies the incoming alternating current from terminals 404 and 406 and produces a fully rectified current at terminal 420 and 422. The CD 110" operates similar to section 110 of system 10. A drive, load clamp and current limiting circuit in section 110" controls transistors 430–436. Current is allowed to flow through transistors 430 and 436 while current is being blocked from flowing through transistors 432 and 434 and vice versa. The transistors are operated in alternate fashion at a high frequency, such as twenty-five kilohertz. The flow of current through lamp 260 is similar to that depicted in graph 300 of FIG. 5. The rectified sixty hertz sine wave is alternately inverted at the set high frequency. Transformer 444, capacitor 452, and inductor 454 form a current limiting circuit 470.

The present invention provides many benefits over prior art systems. The present invention utilizes a high frequency design which operates the fluorescent lamp at optimum efficiency. The present invention is realized by a unique IC chip which contains both logic and power switches. This greatly reduces the cost and enhances the reliability of the system.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

I claim:

1. A fluorescent lamp system comprising:

a power source;

a first fluorescent lamp; and an integrated circuit chip connected intermediate the power source and the lamp, the chip containing switching means connected to the power source and the lamp, for delivering power to the lamp, and control means connected to said switching means for operating said switching means at a frequency which allows the lamp to operate at optimum efficiency.

2. The system of claim 1 further comprising, a current limiting circuit connected intermediate the lamp and the IC chip.

3. The system of claim 1 further comprising, a second fluorescent lamp connected to said switching means of the IC chip and wherein, said control means operates said switching means to alternately supply power to the first and second lamps at said frequency.

4. The system of claim 1 wherein, the IC chip further comprises a rectifier connected intermediate the power source and said switching means.

5. A fluorescent lamp system comprising:

a power source;

a first fluorescent lamp; and an integrated circuit (IC) chip connected intermediate the power source and the lamp, the IC chip containing switching means connected to the power source and the lamp for delivering power to the lamp, a drive means connected to said switching means for operating said switching means, an oscillator means connected to said drive means for operating said drive means at a certain frequency, and a control means connected to said oscillator means for setting said oscillator means at said frequency.

6. The system of claim 5 further comprising, a current limiting circuit connected intermediate the lamp and the IC chip.

7. The system of claim 5 further comprising, a second fluorescent lamp connected to said switching means of the IC chip and wherein said control means operating said switching means to alternately supply power to said first and second lamps at said frequency.

8. The system of claim 5 wherein, the IC chip further comprises a rectifier connected intermediate the power source and said switching means.

9. The system of claim 5 further comprising, a variable voltage means connected intermediate the power source and said switching means of the IC chip for varying a voltage from the power source; and the IC chip further comprising a voltage compensator means connected to the variable voltage means and said control means, for sending a signal to said control means to change said frequency responsive to a change in said voltage.

10. The system of claim 5 wherein, the IC chip further comprises a load status detection means connected to said switching means and said control means for monitoring a power level in said switching means and providing a shut off signal to said control means when said power level exceeds a certain value.

11. The system of claim 5 wherein, the IC chip further comprises a thermal overload means connected to said drive means, for measuring a temperature level inside the IC chip and providing a shut down signal to said drive means when said temperature level exceeds a certain value.

12. The system of claim 5 wherein, said frequency is between twenty-five and fifty kilohertz.

* * * * *